(12) United States Patent
Shimotsu et al.

(10) Patent No.: US 8,475,054 B2
(45) Date of Patent: Jul. 2, 2013

(54) CONNECTOR

(75) Inventors: Akihiro Shimotsu, Ebina (JP);
Masayuki Arai, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 241 days.

(21) Appl. No.: 12/992,835

(22) PCT Filed: May 13, 2009

(86) PCT No.: PCT/US2009/043695
§ 371 (c)(1),
(2), (4) Date: Feb. 8, 2011

(87) PCT Pub. No.: WO2009/140324
PCT Pub. Date: Nov. 19, 2009

(65) Prior Publication Data
US 2011/0129188 A1 Jun. 2, 2011

(30) Foreign Application Priority Data

May 13, 2008 (JP) .................................. 2008-125610

(51) Int. Cl.
*G02B 6/38* (2006.01)
(52) U.S. Cl.
USPC ........................................................... 385/75
(58) Field of Classification Search
USPC .......................................................... 385/88
See application file for complete search history.

(56) References Cited

U.S. PATENT DOCUMENTS

| 7,559,702 | B2 * | 7/2009 | Fujiwara et al. ................ 385/88 |
| 7,572,071 | B1 * | 8/2009 | Wu ................................ 385/94 |
| 8,083,418 | B2 * | 12/2011 | Fujiwara et al. ................ 385/92 |
| 2006/0098923 | A1 | 5/2006 | Fujiwara et al. | |
| 2007/0122090 | A1 | 5/2007 | Nishio et al. | |

FOREIGN PATENT DOCUMENTS

EP    1 884 810 A1   2/2008

OTHER PUBLICATIONS

International Search Report for PCT/US2009/043695, Aug. 21, 2009.

* cited by examiner

*Primary Examiner* — Sung Pak
(74) *Attorney, Agent, or Firm* — Timothy M. Morella

(57) ABSTRACT

An electric connector comprises a conductive terminal and a housing. The conductive terminal is provided with a terminal body portion, a soldering portion, to which an end portion of an electric wire is soldered, and a connection portion connected to a counterpart terminal. The housing is provided with a terminal receipt-hole, in which at least a portion of the terminal body portion is received, and a soldering portion accommodation-groove, in which at least a portion of the soldering portion is accommodated. The soldering portion accommodation-groove is provided with inner side walls, that extend along lateral ends of a soldering surface of the soldering portion, and a concave portion, which is formed in the inner side walls so that a portion of solder that is used for soldering of the end portion of the electric wire is able to come into the concave portion.

20 Claims, 8 Drawing Sheets

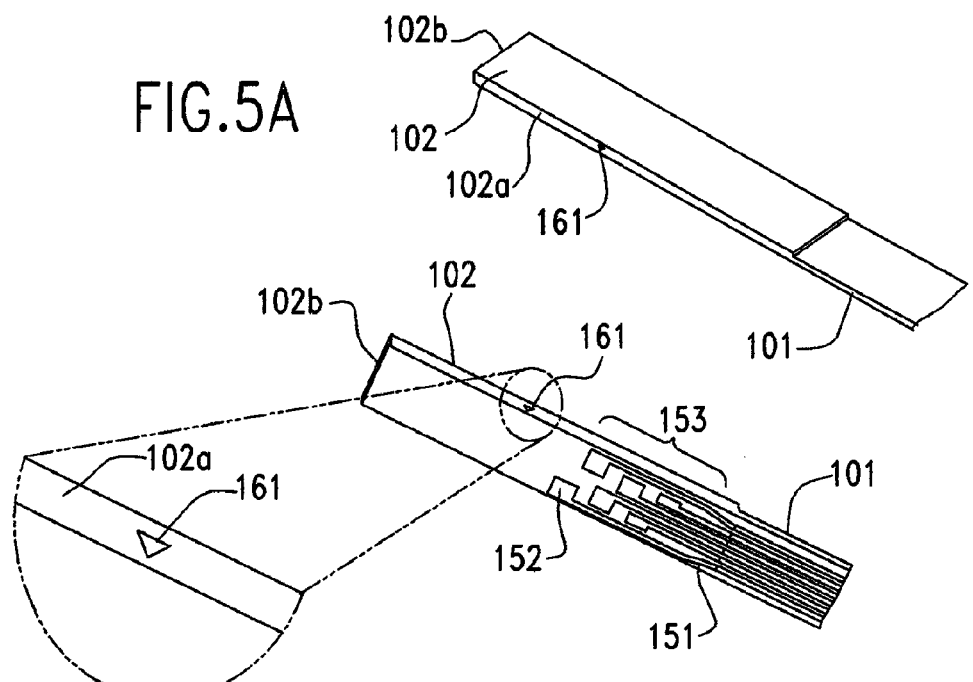
FIG.5A
FIG.5B
FIG.5C
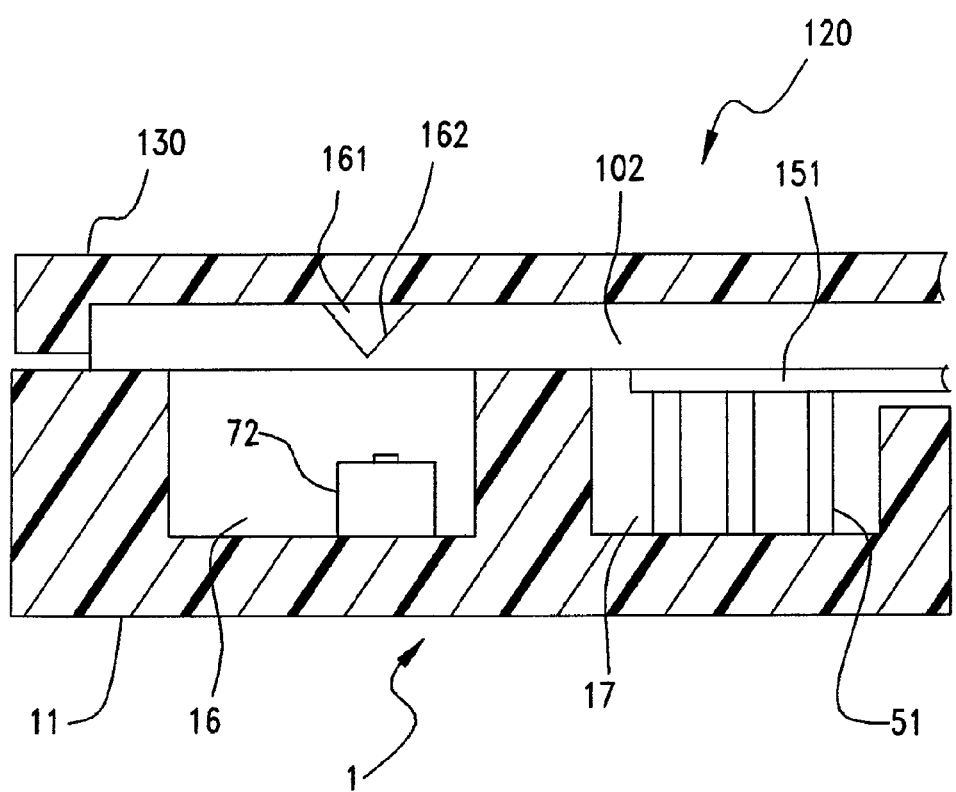
FIG.7

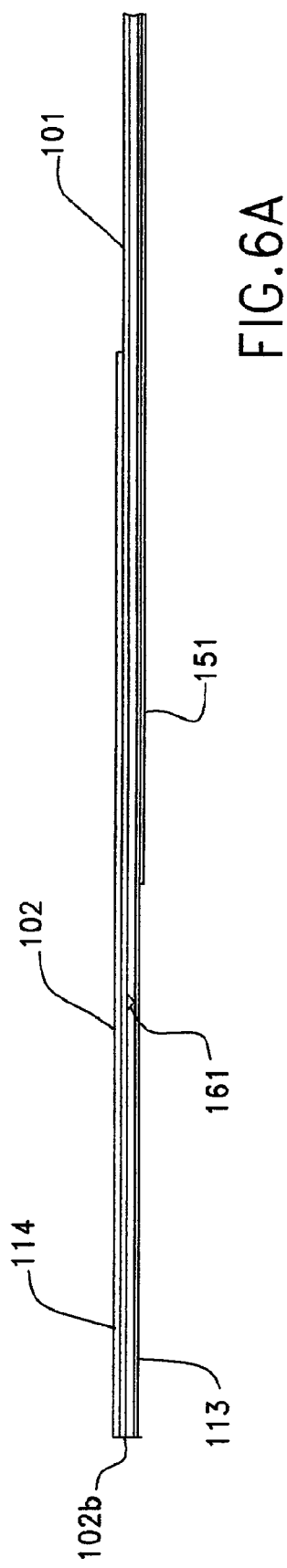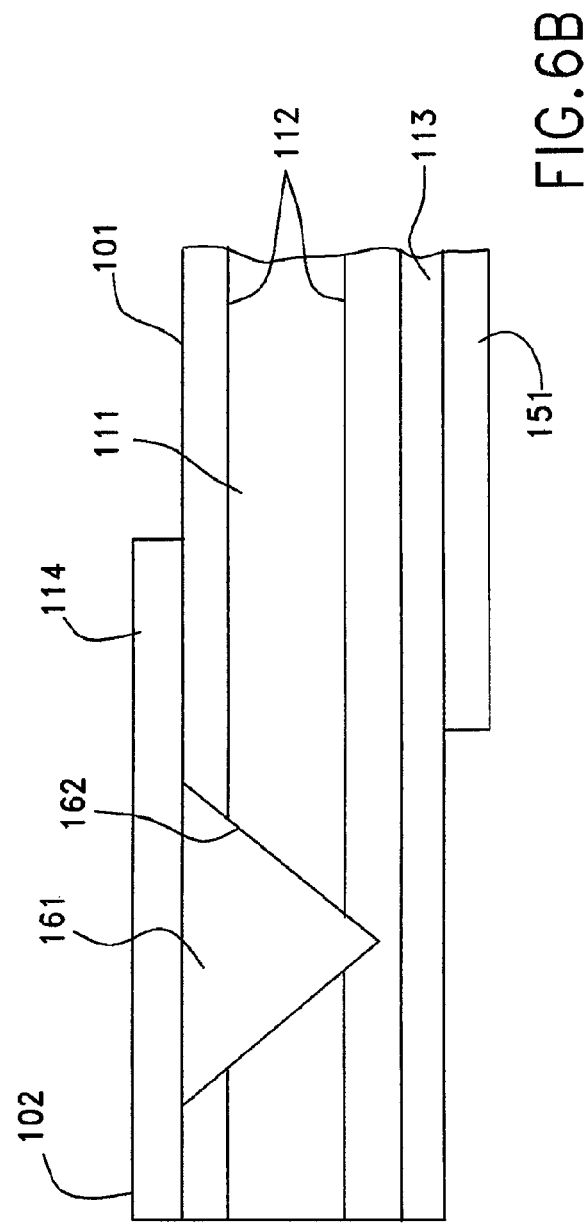

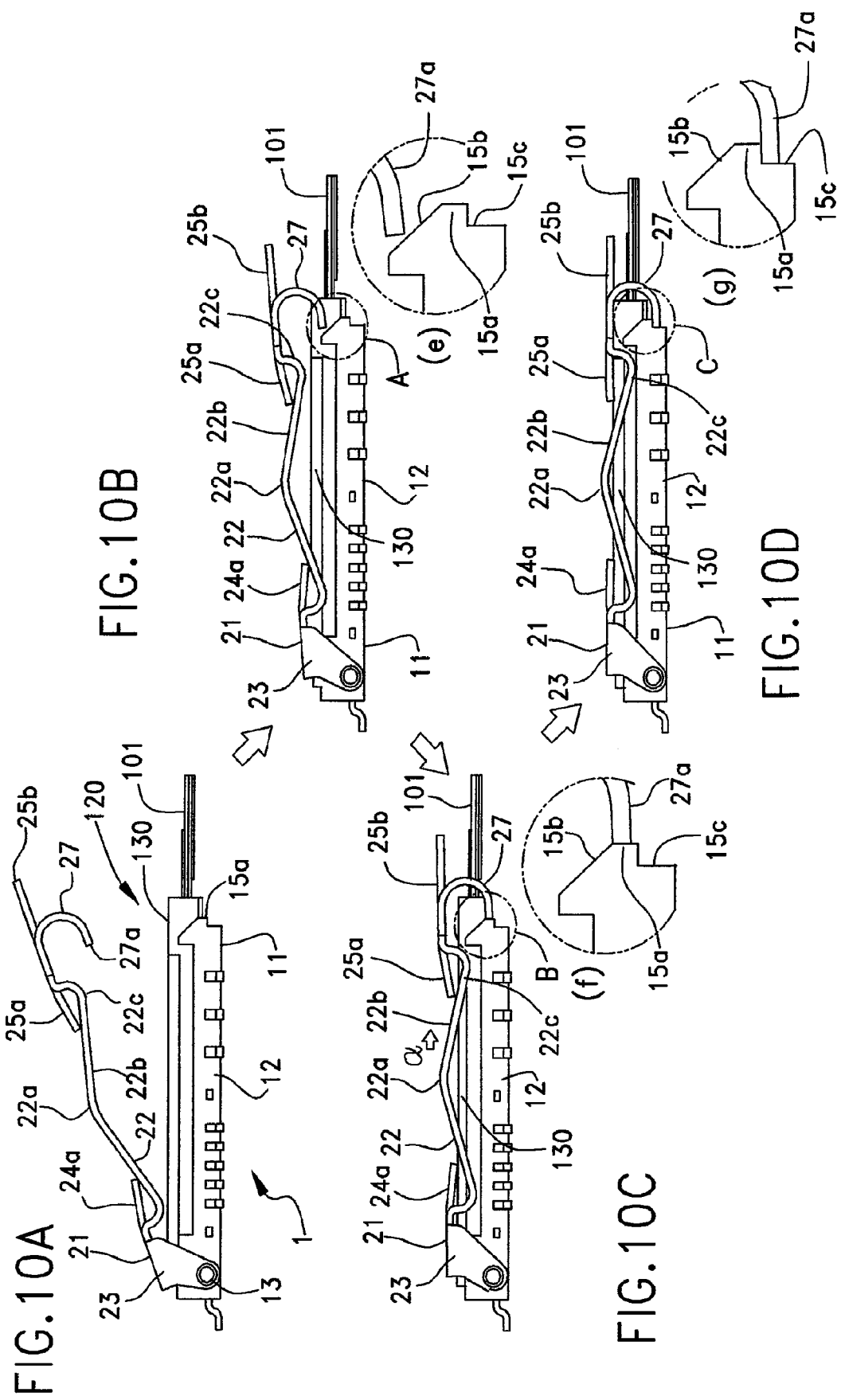

CONNECTOR

RELATED APPLICATIONS

This application claims priority to Japanese Application No. 2008-125610, filed May 13, 2008, and to PCT Application No. PCT/US2009/043695, filed May 13, 2009, both of which are incorporated herein by reference in their entirety.

BACKGROUND OF THE INVENTION

1. Field of the Invention

The Present Invention relates generally to a connector and, more particularly, to a connector in which a plug connected to a cable is mounted on a housing by means of an extendible lock member and provided with a bent portion so that the plug can be reduced in its overall size and that the connection between the plug and the connector can be maintained.

2. Description of the Related ART

One way in which a conventional electronic device or apparatus can realize both a decrease in the overall size of a casing thereof and an increase in the overall size of a display screen thereof is to configure the casing to be collapsible. In such a case, a flexible printed circuit and conductive wires may be arranged so as to pass through an inside of a hinge portion that allows one casing to be pivotably connected with the other casing so that signals can be transmitted through parallel transmission.

Although signal transmission speed must necessarily increase in response to an increase in image resolution, since there is a limit in increasing the inside dimension of the hinge portion, it is practically impossible to arrange a conductive wire having a large width or diameter. In addition, in order to counter against electromagnetic interference (EMI) is taken, the conductive wire will be required to become larger in width or diameter. In this regard, a method of optical transmission has been alternatively studied which is capable of transmitting a large amount of signals through serial transmission and is an excellent EMI countermeasure. One example of such a method can be found in Japanese Patent Application Laid-Open No. 2006-330260.

FIG. 12 is an exploded view of a conventional optical connector, such as may be found in the aforementioned Japanese Patent Application. As shown in FIG. 12, an optical fiber 901 is attached at a distal end thereof to an optical connector body 920. Moreover, a photoelectric conversion module 850, mounted on a circuit board 811, is a chip module mounting thereon an optical semiconductor device 871, which may be a light emitting or receiving element. Furthermore, the circuit board 811 is provided with slit-shaped latching openings 815 at both sides of the photoelectric conversion module 850. In addition, a pair of positioning pins 931 is formed on a lower surface of the optical connector body 920, and a pair of pin holes 831 is formed on an upper surface of the photoelectric conversion module 850 so that the positioning pins 931 may be inserted into the pin holes 831.

When the optical connector body 920 is connected to the photoelectric conversion module 850, the optical connector body 920 is placed on the photoelectric conversion module 850 so that the respective positioning pins 931 are inserted into corresponding pin holes 831. Subsequently, a connector fixing member 821 is attached to the circuit board 811 from above so that the optical connector body 920 is fixed. The connector fixing member 821 is provided with elastic latching pieces 825 that extend downward from both ends of a top plate thereof and is further provided with latching projections 825a formed at a lower end of each of the elastic latching pieces 825. Then, the lower ends of the elastic latching pieces 825 are inserted into the latching openings 815 of the circuit board 811 in a state where the connector fixing member 821 is positioned above and straddles over the optical connector body 920. Thus, the latching projections 825a of the elastic latching pieces 825 are latched to the circuit board 811, and thus the optical connector body 920 is connected to the photoelectric conversion module 850.

However, according to the conventional optical connector, since the optical connector body 920 is configured to be locked when the latching projections 825a of the elastic latching pieces 825 are latched thereto, it is practically impossible to realize both easy unlocking properties and reliable locking properties.

When attachment and removal of the optical connector body 920 to and from the photoelectric conversion module 850 is frequently repeated, it is requested to improve unlocking properties so that the lock state of the optical connector body 920 by the connector fixing member 821 can be easily released. However, when a spring force exerted by the elastic latching pieces 825 is decreased in order to improve the unlocking properties, the latching projections 825a are easily released from the latched state and thus are unnecessarily unlocked, thereby deteriorating the lock reliability. On the other hand, when the spring force exerted by the elastic latching pieces 825 is increased in order to improve the lock reliability, the latching projections 825a become hard to be released from the latched state and it becomes difficult to perform an unlocking operation, thereby deteriorating the unlocking properties. Moreover, when the attachment and removal of the connector fixing member 821 is repeated in a state where the spring force exerted by the elastic latching pieces 825 is increased, the latching projections 825a and the latching openings 815 of the circuit board 811 are extensively worn away.

SUMMARY OF THE INVENTION

Therefore, it is an object of the Present Invention to obviate the above-described problems encountered by the conventional connector and to provide a connector which has high durability and good operability and can be manufactured at a low cost and with simple structure, in which a plug connected to a cable is mounted on a connector housing by means of an extendible lock member and provided with a bent portion, so that the plug can be reduced in its entire size, and the connection between the plug and the connector can be maintained. As a result, it is possible to realize both easy unlocking properties and reliable locking properties.

Therefore, a connector according to the Present Invention includes a connector housing configured to mount on a plug having a cable connected thereto; and a lock member which is attached to the connector housing in an attitude-changeable state and configured to be capable of locking the plug; wherein the lock member includes a bent portion and is provided with an extendable portion configured to extend or contract in response to a change in an extent of bending of the bent portion and a latched portion configured to be engaged with or disengaged from the connector housing by the extension/contraction of the extendable/contractible portion.

In the connector according to another embodiment of the Present Invention, the extendable portion has one end thereof being connected to the latched portion and the other end thereof being connected to an attachment portion configured to be pivotably attached to the connector housing. Moreover, the bent portion is positioned between the latched portion and the attachment portion, so that a spacing between the latched portion and the attachment portion is increased or decreased in response to a change in the extent of bending of the bent portion.

In the connector according to a further embodiment of the Present Invention, the plug has a positioned portion provided therein and the connector housing has a positioning portion provided therein. While the lock member is being maintained at an open position thereof, the plug is mounted on the connector housing so that the positioning portion is engaged with the positioned portion. Meanwhile, when the lock member is brought to a closed position thereof, the plug is locked at the connector housing thereby establishing a connection to the cable.

In the connector according to a still further embodiment of the Present Invention, the plug is mounted on the connector housing so that a lower surface thereof opposes an upper surface of the connector housing. Moreover, the lock member is provided with a plug pressing portion configured to be capable of pressing an upper surface of the plug toward an upper surface of the connector housing.

In the connector according to a still further embodiment of the Present Invention, the connector housing is provided with a latching portion with which the latched portion is engaged or from which the latched portion is disengaged, and wherein the latching portion is provided with a tapered slope surface which is formed on an upper surface of the latching portion and allows a distal end portion of the latched portion to slide thereon, and a concave latching portion which is formed under the tapered slope surface and allows a distal end portion of the latched portion to come into the concave latching portion.

In the connector according to a still further embodiment of the Present Invention, the cable is a hybrid cable having laminated therein an optical waveguide and conductive wires, and the plug is provided with a plug-side optical connection portion and a plug-side electric connection portion. Moreover, the connector housing is provided with an optical connection portion and an electric connection portion. Thus, when the plug is mounted on the connector housing, the plug-side optical connection portion and the plug-side electric connection portion oppose the optical connection portion and the electric connection portion, respectively.

In accordance with the connector of the Present Invention, the plug connected to the cable is mounted on a connector housing by means of a lock member capable of extending and contracting and provided with a bent portion. Owing to this configuration, the plug can be miniaturized, and the connection between the plug and the connector can be performed in an easy and accurate manner. Moreover, it is possible to realize both easy unlocking properties and reliable locking properties. Accordingly, it is possible to provide a connector which has high durability and good operability and can be manufactured at a low cost and with simple structure.

BRIEF DESCRIPTION OF THE FIGURES

The organization and manner of the structure and operation of the Present Invention, together with further objects and advantages thereof, may best be understood by reference to the following Detailed Description, taken in connection with the accompanying Figures, wherein like reference numerals identify like elements, and in which:

FIGS. 5A to 5C are views illustrating a structure of a connection end portion of the hybrid cable according to the embodiment of the Present Invention, in which FIG. 5A is a top perspective view, FIG. 5B is a bottom perspective view, and FIG. 5C is an enlarged view of a main part of FIG. 5B;

FIGS. 6A and 6B are views illustrating a layer structure of the connection end portion of the hybrid cable according to the embodiment of the Present Invention, in which FIG. 6A is a side sectional view and FIG. 6B is a schematic side sectional view;

FIG. 7 is a schematic side sectional view illustrating the connection relationship between the connection end portion of the hybrid cable and an optical connection portion and an electric connection portion of a receptacle connector according to the embodiment of the Present Invention;

FIGS. 10A to 10G are side views illustrating an operation of tightly fitting the plug to be engaged with the receptacle connector according to the embodiment of the Present Invention, in which FIGS. 10A to 10D are views illustrating a series of operations thereof, FIG. 10E is an enlarged view of the "A" part in FIG. 10B, FIG. 10F is an enlarged view of the "B" part in FIG. 10C, and FIG. 10G is an enlarged view of the "C" part in FIG. 10D;

FIGS. 11A to 11C are side views illustrating an operation of releasing a lock state of the plug according to the embodiment of the Present Invention, in which FIGS. 11A to 11C are views illustrating a series of operations thereof.

DESCRIPTION OF THE PREFERRED EMBODIMENTS

While the Present Invention may be susceptible to embodiment in different forms, there is shown in the Figures, and will be described herein in detail, specific embodiments, with the understanding that the disclosure is to be considered an exemplification of the principles of the Present Invention, and is not intended to limit the Present Invention to that as illustrated.

In the embodiments illustrated in the Figures, representations of directions such as up, down, left, right, front, rear and the like, used for explaining the structure and movement of the various elements of the Present Invention, are not absolute, but relative. These representations are appropriate when the elements are in the position shown in the Figures. If the description of the position of the elements changes, however, it is assumed that these representations are to be changed accordingly.

Figure 1:
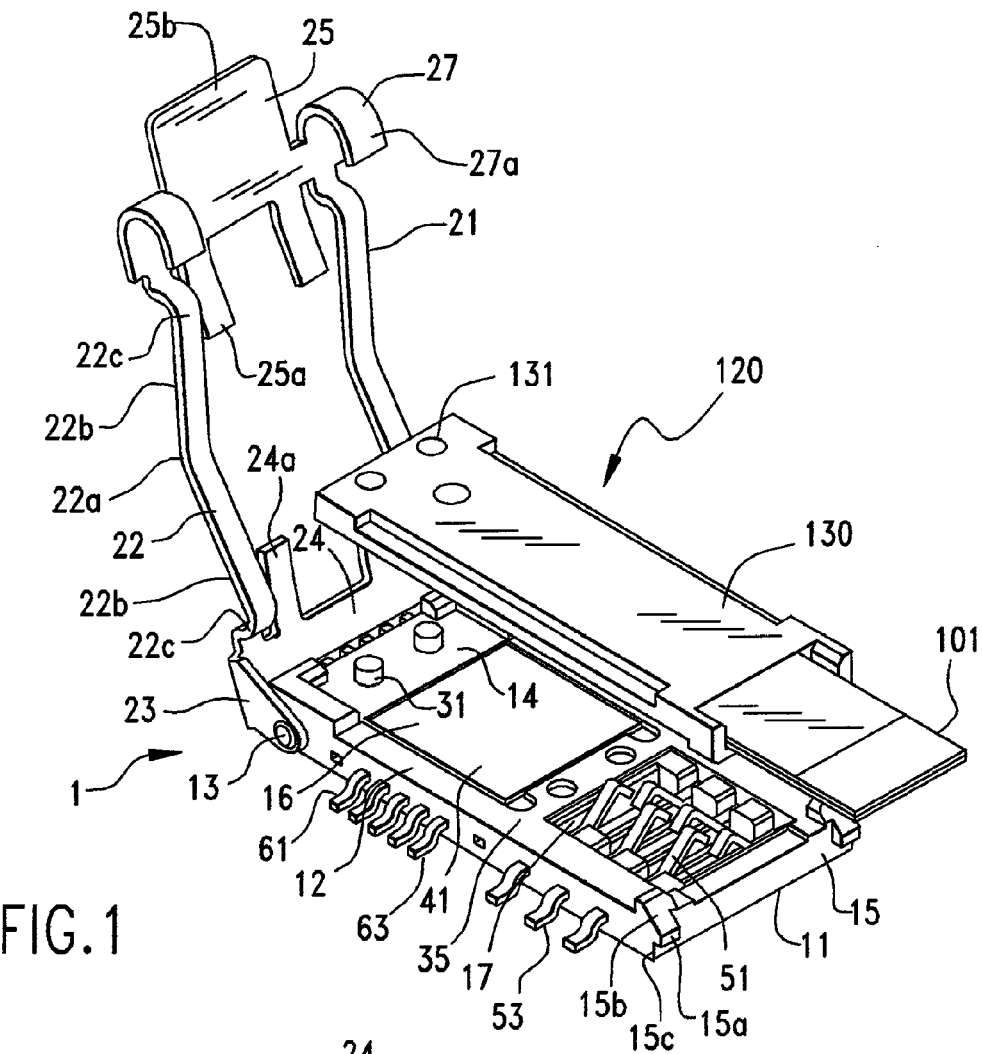
FIG. 1 is a perspective view of a hybrid connector according to an embodiment of the Present Invention, illustrating a state where a lock member is left open and a hybrid cable is maintained at its position prior to being connected.
Figure 3:
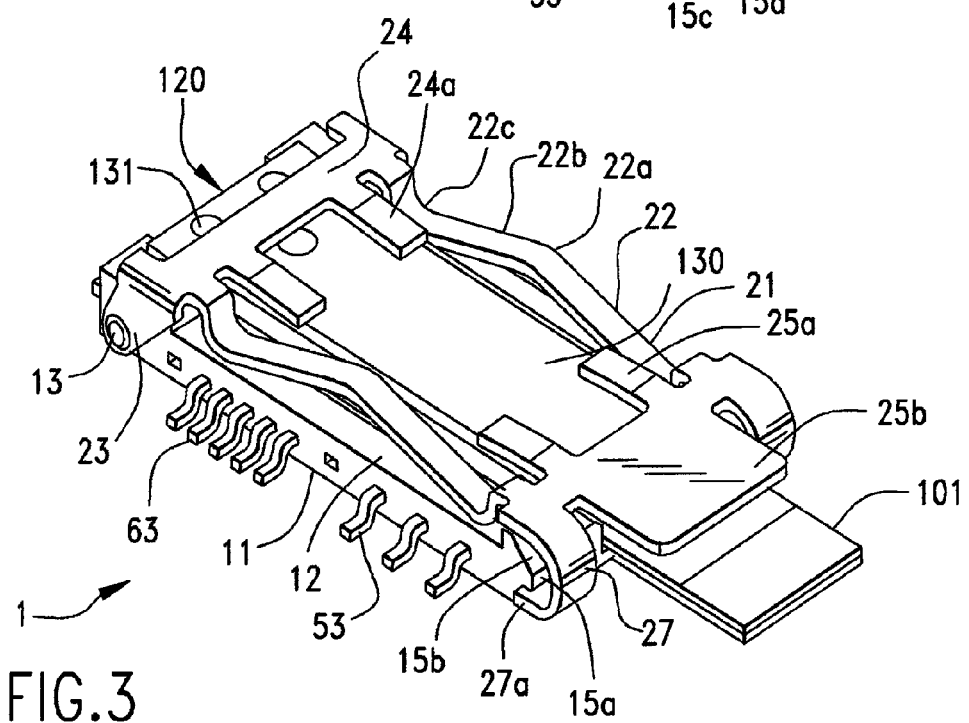
FIG. 3 is a perspective view of the hybrid connector according to the embodiment of the Present Invention, illustrating a state where the lock member is closed and the hybrid cable has been connected.
Figure 2:
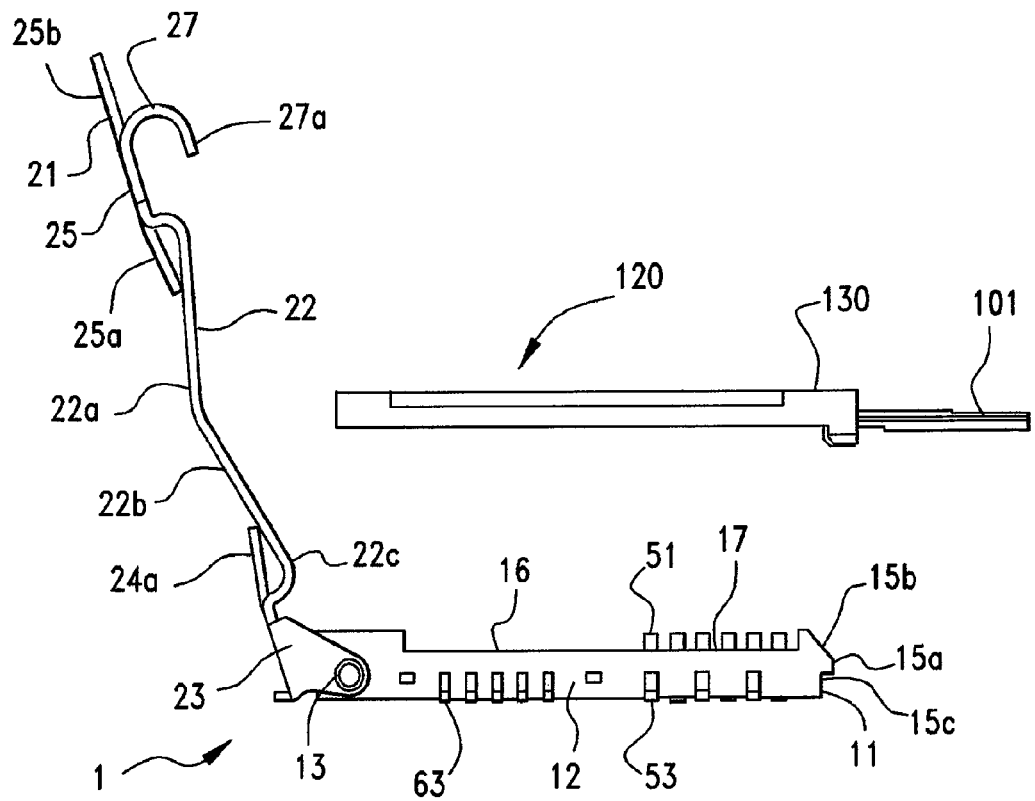
FIG. 2 is a side view of the hybrid connector according to the embodiment of the Present Invention, illustrating the state where the lock member is left open and the hybrid cable is maintained at a position prior to being connected.

Referring to FIGS. 1-3, a receptacle connector 1 is mounted on a surface of a board and functions as a hybrid connector for connecting a hybrid cable 101. In this specification, the hybrid cable 101 is a combined cable having integrated therewith an optical waveguide and later-described conductive wires 151. Specifically, the hybrid cable 101 is one in which a flexible flat plate-like cable is laminated, by bonding, onto one surface of a strip-like optical waveguide to form an integrated body, or one in which a conductive pattern is formed on one surface of a strip-like optical waveguide. In addition, a plug 120 is attached to an end portion of the hybrid cable 101. Moreover, the hybrid cable 101 is connected to the receptacle connector 1 by tightly fitting the plug 120 to be engaged with the receptacle connector 1.

Although the purpose of use of the hybrid cable 101 is not particularly limited, it is particularly useful in an electronic device or apparatus in which a casing is divided into a plurality of parts, and neighboring division parts are rotatably connected with each other, so that the hybrid cable is wired so as to pass through an inside of a hinge portion that rotatably connects the neighboring division parts. Moreover, the hybrid cable 101 is capable of transmitting signals through serial transmission via the optical waveguide, and is an excellent EMI countermeasure, and is thus suitably used for high-speed transmission of a large amount of signals. Furthermore, the receptacle connector 1 is suitably used for being mounted on a surface of a board arranged within a casing of the electronic device or apparatus.

The receptacle connector 1 is provided with a connector housing 11 integrally formed of an insulating material and a lock member 21 as an elastic lock member, integrally formed of an elastically deformable material and attached to the connector housing 11 in an attitude-changeable state. The lock member 21 may be formed by bending and pressing to a metal plate. Moreover, the lock member 21 is capable of changing its attitude by having a proximal end thereof (the lower end in FIG. 2) being rotatably connected to a distal end (the left end in FIG. 2) of the connector housing 11, so that it is rotated between an open position as a first position, as illustrated in FIGS. 1-2, for mounting the plug 120 onto the connector housing 11 and a closed position as a second position, as illustrated in FIG. 3, for locking the plug 120.

The lock member 21 is an approximately rectangular, hollow plate-like member and includes a first crossbar portion 24 and a second crossbar portion 25 configured to extend in a short-axis direction (width direction) and a pair of elongated strip plate-like flexible portions 22, configured to extend in a long-axis direction (vertical direction) so that both ends of the first crossbar portion 24 and the second crossbar portion 25 are connected with each other. The flexible portions 22 function as an extendable/contractible portion.

The first crossbar portion 24 is disposed at a distal end of the lock member 21, and proximal ends of a pair of mounting leg parts 23 are connected to both ends thereof in the short-axis direction. Each of the mounting leg part 23 extends in a direction approximately perpendicular to the first crossbar portion 24 so that a distal end thereof is rotatably connected to a distal end of the connector housing 11 via a rotation shaft 13 of the connector housing 11. In other words, the mounting leg parts 23 can be said to be connected to one ends of the flexible portions 22 via the first crossbar portion 24. Furthermore, proximal ends of first pressing portions 24a configured to extend toward the second crossbar portion 25 are connected between portions of the first crossbar portion 24 connected to the pair of flexible portions 22. In the example illustrated in the Figures, although two first pressing portions 24a are provided and configured as an elongated strip plate-like member, it may be configured as a broad plate-like member and one pressing portion or three or more pressing portions may be provided.

The second crossbar portion 25 is disposed at a rear end of the lock member 21, and proximal ends of a pair of latching arm parts 27 are connected to both ends on the rear end side in the long-axis direction. As illustrated in FIG. 2, each of the latching arm parts 27 has a generally U shape in side view and extends in a direction away from the first crossbar portion 24 to be downwardly bent so that a distal end portion thereof 27a is directed toward the first crossbar portion 24 to be engaged with or disengaged from the connector housing 11. In other words, the latching arm parts 27 can be said to be connected to one ends of the flexible portions 22 via the second crossbar portion 25. Moreover, at the closed position as illustrated in FIG. 3, the distal end portions 27a are latched to lock projections 15a of the connector housing 11. Furthermore, proximal ends of second pressing portions 25a configured to extend toward the first crossbar portion 24 are connected between portions of the second crossbar portion 25 connected to the pair of flexible portions 22. In the example illustrated in the figures, although two second pressing portions 25a are provided and configured as an elongated strip plate-like member, it may be configured as a broad plate-like member and one pressing portion or three or more pressing portions may be provided.

In addition, a proximal end of a plate-like operation portion 25b, extending in a direction away from the first crossbar portion 24, is connected to a portion of the second crossbar portion 25 disposed inner than the portions thereof connected to the latching arm parts 27. Although the operation portion 25b is a portion operated by an operator when an attitude of the lock member 21 is to be changed, the operation portion 25b may be appropriately omitted if not necessary.

Moreover, each of the flexible portions 22 has a generally dog-leg shape in side view as illustrated in FIG. 2 and is provided with a bent portion 22a that is bent so as to upwardly project at the closed position as illustrated in FIG. 3, flat plate-like or straight-line shaped straight portions 22b connected to both sides of the bent portion 22a, and connection portions 22c connecting both ends of the bent portion 22 to the first crossbar portion 24 and the second crossbar portion 25. Since the flexible portions 22 have such a lateral shape and are formed of an elastic material, they are capable of being elastically expanded or contracted. That is, since a distance between both ends of the flexible portion 22 can be increased, it is possible to increase a distance between the first crossbar portion 24 and the second crossbar portion 25. Specifically, when the bent portion 22a is downwardly pressed at the closed position, the degree of bending of the bent portion 22a is decreased and thus an angle between the straight portions 22b at both sides thereof is increased, and as a result, the distance between both ends of the flexible portion 22 is increased. That is, the flexible portion 22 is expanded or contracted in accordance with a change in the degree of bending of the bent portion 22a.

In the example illustrated in the drawing figures, the connection portions 22c are curved so as to downwardly project at the closed position. Owing to this configuration, it is possible to decrease a height dimension of the receptacle connector 1 without needing to change the degree of bending of the bent portion 22a, and thus, the height of the receptacle connector 1 at the closed position can be reduced. Moreover, the connection portions 22c are not necessarily curved so as to downwardly project but may be curved so as to upwardly project. However, when it is not necessary to reduce the height, the connection portions 22c may not be formed in a curved shape but in a flat shape: in such a case, the height dimension of the receptacle connector 1 at the closed position is increased by the amount of the height dimension at the curved portions of the connection portions 22c. Moreover, the bent portion 22a may be bent so as to upwardly project at the closed position. In the example illustrated in the drawing figures, although the bent portion 22a is disposed at an approximately center between the first crossbar portion 24 and the second crossbar portion 25, the bent portion 22a may be disposed at a position close to the first crossbar portion 24 or a position close to the second crossbar portion 25. Moreover, two or more bent portions 22a may be provided. That is, it is not necessary to provide the straight portions 22b, and an extending/contracting function may be provided to the flexible portion 22 as long as at least one bent portion 22a is provided to the flexible portion 22.

Owing to such a configuration, the lock member 21 is capable of locking the plug 120 by pressing the plug 120 against the connector housing 11 from an upper side thereof at the closed position as illustrated in FIG. 3. Moreover, when an operator downwardly presses the bent portion 22a by the operator, the whole body of the lock member 21 is expanded in the long-axis direction so that the latched state of the distal end portion 27a of the latching arm part 27 is released. Therefore, it is easy to release the lock state of the plug 120.

The connector housing 11 is a plate-like member having a generally rectangular shape in top plan view and is provided with a pair of side wall portions 12 extending in the long-axis direction and a rear-end wall portion 15 extending in the width direction at a rear end thereof so as to connect the side wall portions 12 at both sides thereof. The connector housing 11 is further provided with a guide portion 14, an optical connection portion 16, and an electric connection portion 17 being arranged in tandem in the long-axis direction from a distal end thereof toward the rear end. The rotation shaft 13 is attached in the vicinity of a distal end of the side wall portions 12, and the mounting leg parts 23 of the lock member 21 are rotatably attached to the rotation shaft 13.

The opposite side wall portions 12 are connected with each other, at the distal end thereof, by the guide portion 14 while they are connected with each other, at a middle thereof, by a partition wall portion 35 extending in the width direction so as to partition the optical connection portion 16 and the electric connection portion 17.

Moreover, in the vicinity of both ends in the width direction of the rear-end wall portion 15, that is, in rear end surfaces of the opposite side wall portions 12, lock projections 15a as a latching portion are formed. When the lock member 21 is position at the closed position, the distal end portions 27a of the latching arm parts 27 are engaged with the lock projections 15a so that the lock member 21 is latched to the connector housing 11. As a result, the plug 120 is locked. Moreover, since the upper surfaces of the lock projections 15a are configured as tapered surfaces 15b that are downwardly sloped toward a rear side so that the distal end portions 27a can be easily slid on the upper surfaces. Furthermore, concave portions on the lower surface sides of the lock projections 15a are configured as concave latching portions 15c so that the distal end portions 27a can be firmly latched. The lock projections 15a may be formed on side surfaces of the opposite side wall portions 12.

The guide portion 14 functions as a positioning portion and is provided with a flat upper surface as a guide surf and guide projections 31 as a guide portion configured to upwardly project from the upper surface. When guide holes 131 as a guided portion formed in the plug housing 130 of the plug 120 are engaged with the guide projections 31, the plug 120 mounted on the connector housing 11 can be guided to a predetermined position with high precision. Hence, the guide portion 14 functions as a reference for positioning between the receptacle connector 1 and the plug 120. Moreover, the plug 120 is a thin plate-like member having an approximately rectangular shape in top plan view, and when the plug 120 is mounted on the connector housing 11, a lower surface thereof opposes an upper surface of the connector housing 11.

In addition, the optical connection portion 16 is a portion that performs transferring of light to the optical waveguide of the hybrid cable 101 and is configured as a concave portion capable of receiving therein an optical device such as a control IC 71 or the like as a light receiving/emitting control device provided with a later-described optical semiconductor device 72, e.g., a light receiving element 72a and a light emitting element 72b, and a control circuit for controlling the optical semiconductor device 72. In the example illustrated in the drawing figures, an upper surface of the concave portion is sealed by a thin plate-like sealing plate 41 formed of a translucent material such as glass.

Moreover, the optical connection portion 16 receives therein optical terminals 61 formed of a conductive material and connected to the optical semiconductor device 72 or the control IC 71. The optical terminals 61 are provided with tail portions 63 as a board connection portion connected, by soldering or the like, to connection pads formed on a surface of a board so that the tail portions 63 are projected outward from the lateral surfaces of the connector housing 11.

Furthermore, the electric connection portion 17 is a portion that is electrically connected to the conductive wires 151 of the hybrid cable 101 and is configured as a concave portion capable of receiving therein electric connection terminals 51 formed of a conductive material such as metal. The electric connection terminals 51 are provided with contact portions 52 that are formed in the vicinity of free ends thereof and are curved so as to be convex toward the upper side and tail portions 53 as a board connection portion connected, by soldering or the like, to connection pads formed on a surface of a board, so that the tail portions 53 are projected outward from the lateral surfaces of the connector housing 11.

Figure 4:
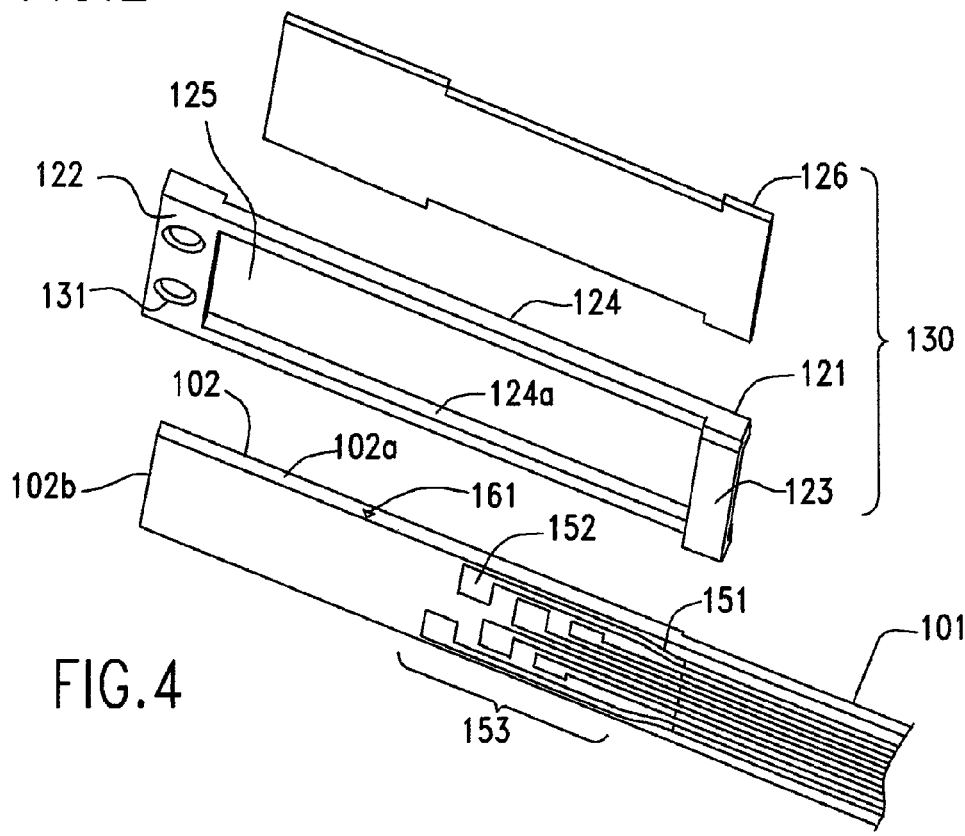
FIG. 4 is an exploded perspective view of a plug according to the embodiment of the Present Invention.

FIG. 4 illustrates an exploded perspective view of a plug. Although the hybrid cable 101 is a thin plate member having an elongated strip shape, only a portion in the vicinity of a front end thereof (left end in the drawing figure) is illustrated in FIG. 4. Moreover, a connection end portion, designated by reference numeral 102, is formed within a range of a predetermined length from a front end surface thereof 102b.

On the lower surface of the hybrid cable 101, a plurality of lines, e.g., six lines of foil-like conductive wires 151 formed of a conductive material such as metal is arranged in parallel with one another at a predetermined pitch on an insulating layer of the hybrid cable 101. Moreover, another insulating film is covered on a lower side of the conductive wires 151. Furthermore, the insulating film is removed in the connection end portion 102 so that the lower surface of the conductive wires 151 is exposed.

In addition, connection pad portions 152 having a large width are formed at distal ends of the respective conductive wires 151. The respective connection pad portions 152 are formed at positions corresponding to the contact portions 52 of the electric connection terminals 51 received in the electric connection portion 17 of the connector housing 11 in a state where the hybrid cable 101 is connected to the receptacle connector 1. Moreover, a portion within the range, where the connection pad portions 152 are arranged, functions as a plug-side electric connection portion 153. Although the connection pad portions 152 may be arranged in an arbitrary form, it is preferable that they are arranged in a zigzag form, or arranged in tandem in an axial direction of the hybrid cable 101, as illustrated in the drawing figures. Owing to this configuration, it is possible to arrange a number of connection pad portions 152 without needing to increase the width of the connection end portion 102, and as a result, it is possible to suppress any increase in the width dimension of the plug 120.

Moreover, at a portion of the connection end portion 102 disposed closer the front end than the connection pad portions 152, an optical path conversion portion 161 as a plug-side optical connection portion is formed. The optical path conversion portion 161 is provided with a later-described slope surface 162 capable of changing a direction of light transmitted from the optical waveguide to about a right angle. That is, the optical path conversion portion 161 changes an optical path extending in an axial direction of the hybrid cable 101 to an optical path extending in a direction perpendicular to the lower surface of the hybrid cable 101. Owing to this configuration, light transmitted through the optical waveguide can be emitted toward the lower side from the lower surface of the hybrid cable 101, and light incident onto the lower surface of the hybrid cable 101 from the lower side can be introduced to the optical waveguide. The optical path conversion portion 161 is formed at a position corresponding to the optical semiconductor device 72 received in the optical connection portion 16 of the connector housing 11 in a state where the hybrid cable 101 is connected to the receptacle connector 1.

The plug housing 130 includes a plug housing body 121 configured as a rectangular frame-like member extending in an axial direction of the hybrid cable 101 and a plug top plate 126 configured as a rectangular plate-like member extending in the axial direction of the hybrid cable 101. The plug housing body 121 is a member integrally formed of an insulating material such as synthetic resin and is provided with a pair of side wall portions 124 extending in the long-axis direction, a front crossbar portion 122 configured to connect front ends of the side wall portions 124 with each other, and a rear crossbar portion 123 configured to connect rear ends of the side wall portions 124 with each other. Moreover, a rectangular opening, designated by reference numeral 125, penetrating through the plug housing body 121 in a thickness direction thereof, has a perimeter thereof defined by the side wall portions 124, the front crossbar portion 122, and the rear crossbar portion 123.

The dimension in the thickness direction of the side wall portions 124 is approximately identical to a dimension in the thickness direction of the connection end portion 102 of the hybrid cable 101. Moreover, when inner side surfaces 124a of the side wall portions 124 are brought into tight contact with the side surfaces 102a of the connection end portion 102 of the hybrid cable 101, the position in the width direction of the hybrid cable 101 is determined by the side wall portions 124.

Moreover, the front crossbar portion 122 functions as a positioned portion of the plug 120 and is configured as a rectangular plate-like member having a rectangular sectional shape, being provided with a flat lower surface as a guided surface and guide holes 131 as a guided member, penetrating in a thickness direction of the plate-like member. The front crossbar portion 122 functions as a guided portion when the plug 120 is mounted on the connector housing 11, so that the guide holes 131 are engaged with the guide projections 31 of the connector housing 11, and the lower surface is engaged with the upper surface of the guide portion 14 of the connector housing 11. Moreover, the lower surface of the front crossbar portion 122 is formed such that it is at the same surface as the lower surface of the side wall portions 124. Furthermore, the rear end surface of the front crossbar portion 122 is brought into tight contact with the front end surface 102b of the connection end portion 102 of the hybrid cable 101, so that the position in the axial direction of the hybrid cable 101 is determined. In addition, the dimension in the thickness direction of the front crossbar portion 122 is approximately identical to a sum of a dimension in the thickness direction of the side wall portions 124 and a dimension in the thickness direction of the plug top plate 126.

The rear crossbar portion 123 is a rectangular plate-like member having a rectangular sectional shape and is provided with a flat upper surface, being configured such that an upper surface thereof is brought into tight contact with the lower surface of the connection end portion 102 of the hybrid cable 101, so that the hybrid cable 101 is supported from the lower side. The rear crossbar portion 123 is connected to the side wall portions 124 so that the upper surface thereof is at the same surface as the lower surface of the side wall portions 124. Therefore, the rear end surface of the plug housing body 121 has an approximately U shape as viewed from a rear side thereof.

Moreover, the plug top plate 126 is an approximately rectangular thin plate-like member and is fixed by being attached to the plug housing body 121 so that the opening 125 is blocked from the upper side. In the example illustrated in the drawing figures, although the plug housing body 121 and the plug top plate 126 are formed to be separated from each other, the plug housing body 121 and the plug top plate 126 may be integrally formed therewith. Furthermore, it is preferable that the plug top plate 126 functions as a shielding plate. For example, it is preferably configured as one formed of a metal plate, one obtained by over-molding a metal plate with synthetic resin, one formed of a laminated composite plate containing a metal layer, or one formed of a conductive composite material in which a conductive material such as metal or carbon is mixed into a matrix of synthetic resin or the like.

In addition, the length of the plug top plate 126, that is, a dimension thereof in the long-axis direction, is approximately the same as a dimension of the plug housing body 121 as measured from the rear end surface of the front crossbar portion 122 to the front end surface of the rear crossbar portion 123. Moreover, the width of the plug top plate 126, that is, a dimension thereof in the short-axis direction, is approximately the same as a dimension of the plug housing body 121 as measured from an outer surface of one of the side wall portions 124 to an outer surface of the other of the side wall portions 124.

When the plug top plate 126 is fixed by being attached to the plug housing body 121 so that the front end surface of the plug top plate 126 is brought into tight contact with the rear end surface of the front crossbar portion 122, the assembly of the plug housing 130 is completed. In this case, the whole surface of the opening 125 and the upper surface of the side wall portions 124 are covered by the plug top plate 126. Moreover, when the plug housing body 121 and the plug top plate 126 are integrally formed therewith, the plug top plate 126 is originally attached to the plug housing body 121. In the assembled plug housing 130, the upper surface of the front crossbar portion 122 is at the same surface as the plug top plate 126.

Referring now to FIGS. 5-7, the hybrid cable 101 is a flexible flat plate-like member having an elongated strip shape and has a laminated structure in which a layer of the conductive wires 151 is laminated on the lower side of the layer of the optical waveguide. Moreover, as described above, the conductive wires 151 are exposed to the lower surface of the connection end portion 102, the optical path conversion portion 161 is formed at a portion of the conductive wires 151 disposed closer to the front end than the connection pad portions 152 so that light transmitted through the optical waveguide can be emitted toward the lower side from the lower surface of the hybrid cable 101, and light incident onto the lower surface of the hybrid cable 101 from the lower side can be introduced to the optical waveguide.

As will be understood from FIG. 6B, the optical waveguide includes core portions 111 serving as a light transmission path through which light can be transmitted and a clad portion 112 configured to surround the core portion 111 and capable of exerting a function of confining light in the core portions 111. In the example illustrated in the drawing figure, although the number of core portions 111 is two, the number may be one or three or more and may be set arbitrarily.

Moreover, although a transmission mode of the optical waveguide may be any one of a single mode and a multi mode, in this example, it will be described as being a multi mode. Furthermore, a refractive index of the clad portion 112 is preferably set to a value lower than a refractive index of the core portions 111. For example, the clad portion 112 is preferably formed of a material so that a difference between the refractive indexes of the clad portion 112 and the core portions 111 becomes 0.01 or more. The optical waveguide is not limited to such a form and may have any other forms as long as they have the core portions 111 capable of transmitting light and the clad portion 112 capable of confining light in the core portions 111. For example, the optical waveguide may be an optical waveguide formed by laminating material layers, an optical waveguide formed by etching material layers, or an optical waveguide having a photonics structure. Furthermore, the optical waveguide may be formed of any kinds of materials as long as they can satisfy the above-mentioned refractive index requirements.

On the lower surface of the clad portion 112, an insulating film 113 as an insulating layer is bonded. Although the insulating film 113 may be formed of any materials as long as they have flexible, translucent, and insulating properties, in this specification, it will be described as being a film formed of polyimide. In this way, since the insulating film 113 has translucent properties, light can pass through the insulating film 113 to be emitted toward the lower side from the lower surface of the hybrid cable 101 or to be incident onto the lower surface of the hybrid cable 101 from the lower side.

Moreover, on a lower surface of the insulating film 113, foil-like conductive wires 151 are bonded. The conductive wires 151 may be formed of any materials as long as they have conductive properties. Although they are formed of copper foil or gold foil, for example, they may be one obtained by plating the surface of copper foil with gold.

On the other hand, on an upper surface of the clad portion 112, a backing film 114 as a support member is bonded. The backing film 114 has the same width as the width of the hybrid cable 101 and is bonded onto the entire range of the connection end portion 102 so that the connection end portion 102 has some degree of rigidity and is thus hardly deformed. Owing to this configuration, only the connection end portion 102 of the flexible hybrid cable 101 has some degree of rigidity and is thus hardly deformed. Therefore, it is possible to facilitate an operation for attaching the plug housing 130 to the connection end portion 102 and to thus improve the close contactness, after attachment, between the connection end portion 102 and the plug housing 130. Although the backing film 114 is formed of synthetic resin, the backing film 114 may be formed of any materials as long as they have some degree of rigidity as well as insulating properties.

Here, the optical path conversion portion 161 is approximately rectangular equilateral triangular shaped in sectional view thereof and is configured as an elongated hole extending in the width direction of the hybrid cable 101 and is provided with a slope surface 162 functioning as a mirror surface. The slope surface 162 is inclined at an angle of about 45 degrees with respect to the axial direction (horizontal direction in FIG. 6B) and the thickness direction (vertical direction in FIG. 6B) of the hybrid cable 101. The slope surface 162 is capable of reflecting light transmitted through the optical waveguide to be emitted to the lower side from the lower surface of the hybrid cable 101 while reflecting light incident onto the lower surface of the hybrid cable 101 from the lower side to be introduced to the optical waveguide.

Moreover, the inclination angle of the slope surface 162 can be appropriately changed depending on the refractive indexes of the core portions 111 and the clad portion 112 so that an optimum optical loss can be provided. The slope surface 162 can be formed by applying dicing (or die-cutting) processing or laser processing. Specifically, before a step of bonding the backing film 114 is performed, a groove having an approximately triangular sectional shape having an open upper surface and extending in the width direction is formed in the optical waveguide by means of dicing processing or laser processing. Thereafter, the backing film 114 is bonded onto the upper surface of the clad portion 112 so as to block the upper surface of the groove, and thus, the optical path conversion portion 161 having an elongated hole shape can be obtained. Since the upper surface of the optical path conversion portion 161 is blocked by the backing film 114, the possibility of foreign material such as dust entering into the optical path conversion portion 161 and thus adhering to the slope surface 162 can be reduced. Moreover, although a lower end of the groove is squeezed into the clad portion 112 on the lower side of the core portions 111, the groove is formed so as not to penetrate through the lower portion of the clad portion 112.

In the plug 120 assembled by attaching the plug housing 130 to the connection end portion 102 of the hybrid cable 101, the position in the axial direction of the hybrid cable 101 relative to the plug housing 130 is determined by bringing the front end surface 102b of the connection end portion 102 into tight contact with the rear end surface of the front crossbar portion 122. For this reason, when the position in the axial direction of the optical path conversion portion 161 and the plug-side electric connection portion 153 is fixed based on the front end surface 102b, it is possible to easily and strictly define the distances in the axial direction as measured from the guide holes 131 formed in the front crossbar portion 122 to the plug-side electric connection portion 153 and to the optical path conversion portion 161 by simply bringing the front end surface 102b of the connection end portion 102 into tight contact with the rear end surface of the front crossbar portion 122.

In addition, the position in the width direction of the hybrid cable 101 relative to the plug housing 130 can be determined by bringing the side surfaces 102a of the connection end portion 102 into tight contact with the inner side surfaces 124a of the side wall portions 124. For this reason, when the positions in the width direction of the optical path conversion portion 161 and the plug-side electric connection portion 153 are fixed based on the side surfaces 102a, it is possible to easily and strictly define the distances in the width direction as measured from the outer side surfaces of the side wall portions 124 to the plug-side electric connection portion 153 and to the respective core portions 111 of the optical path conversion portion 161 by only bringing the side surfaces 102a of the connection end portion 102 into tight contact with the inner side surfaces 124a of the side wall portions 124.

Moreover, since the guide holes 131 being the guided portion when the plug 120 is mounted on the connector housing 11, the optical path conversion portion 161, and the plug-side electric connection portion 153 are not arranged in parallel with one another but arranged in tandem in the axial direction, it is not necessary to increase the dimension in the width direction of the plug 120, but it is only necessary to be slightly greater than the dimension in the width direction of the hybrid cable 101. Specifically, the width-directional dimension of the plug 120 only needs to be large enough to correspond to the sum of the width-directional dimension of the hybrid cable 101 and the width-directional dimension of the pair of side wall portions 124. In this case, since the side wall portions 124 are configured as an elongated rod-shaped member, the width-directional dimension thereof has a small value, and as a result, the width-directional dimension of the plug 120 can be set to a value slightly larger than the width-directional dimension of the hybrid cable 101.

Furthermore, since the width-directional dimension of the plug 120 only needs to be large enough to correspond to the sum of the thickness-directional dimension of the connection end portion 102 and the thickness-directional dimension of the plug top plate 126, the width-directional dimension of the plug 120 can be set to a value slightly larger than the thickness-directional dimension of the hybrid cable 101.

In addition, the plug 120 has a generally simple shape that is rectangular in top plan view and side view, and thus has a shape with little unevenness.

Therefore, even when the hybrid cable 101 is wired so as to pass through the inside of a hinge portion that connects the respective portions of a casing of an electronic device or apparatus, since the plug 120 attached to the end portion of the hybrid cable 101 has a simple shape and a small size with a width and a thickness slightly larger than those of the hybrid cable 101, the wiring operation can be performed in an extremely simple manner.

Moreover, since the guide holes 131 are engaged with the guide projections 31 in a state where the plug 120 is connected to the receptacle connector 1, the position of the plug 120 relative to the connector housing 11 is fixed with respect to the axial direction and the width direction of the hybrid cable 101. Therefore, as will be understood from FIG. 7, in a state where the plug 120 is connected to the receptacle connector 1, the optical path conversion portion 161 of the plug 120 is disposed at a position right above the optical semiconductor device 72 received in the optical connection portion 16 of the receptacle connector 1. Moreover, the core portion 111 corresponding to the light emitting element 72*b* in the width direction of the hybrid cable 101 is disposed at a position right above the light emitting element 72*b*. Owing to this configuration, the hybrid cable 101 and the receptacle connector 1 are optically connected with each other.

That is, light emitted from a light emitting surface of the optical semiconductor device 72 is incident onto the hybrid cable 101 from the lower side thereof, reflected from the slope surface 162 disposed close to the rear side of the optical path conversion portion 161, introduced to the core portion 111 corresponding to the light emitting element 72*b* while changing a traveling direction thereof to about a right angle, and transmitted through the core portion 111 along the axial direction of the hybrid cable 101. On the other hand, light transmitted through the core portion 111 along the axial direction of the hybrid cable 101 is reflected from the slope surface 162 disposed close to the rear side of the optical path conversion portion 161, emitted toward the lower side from the lower surface of the hybrid cable 101 while changing a traveling direction thereof to about a right angle, and received by a light receiving surface of the optical semiconductor device 72.

In addition, the plug-side electric connection portion 153 of the plug 120 is disposed at a position right above the electric connection portion 17 of the receptacle connector 1, and the respective connection pad portions 152 are brought into electrical contact with the contact portions 52 of corresponding ones of the electric connection terminals 51 received in the electric connection portion 17.

Figure 8:
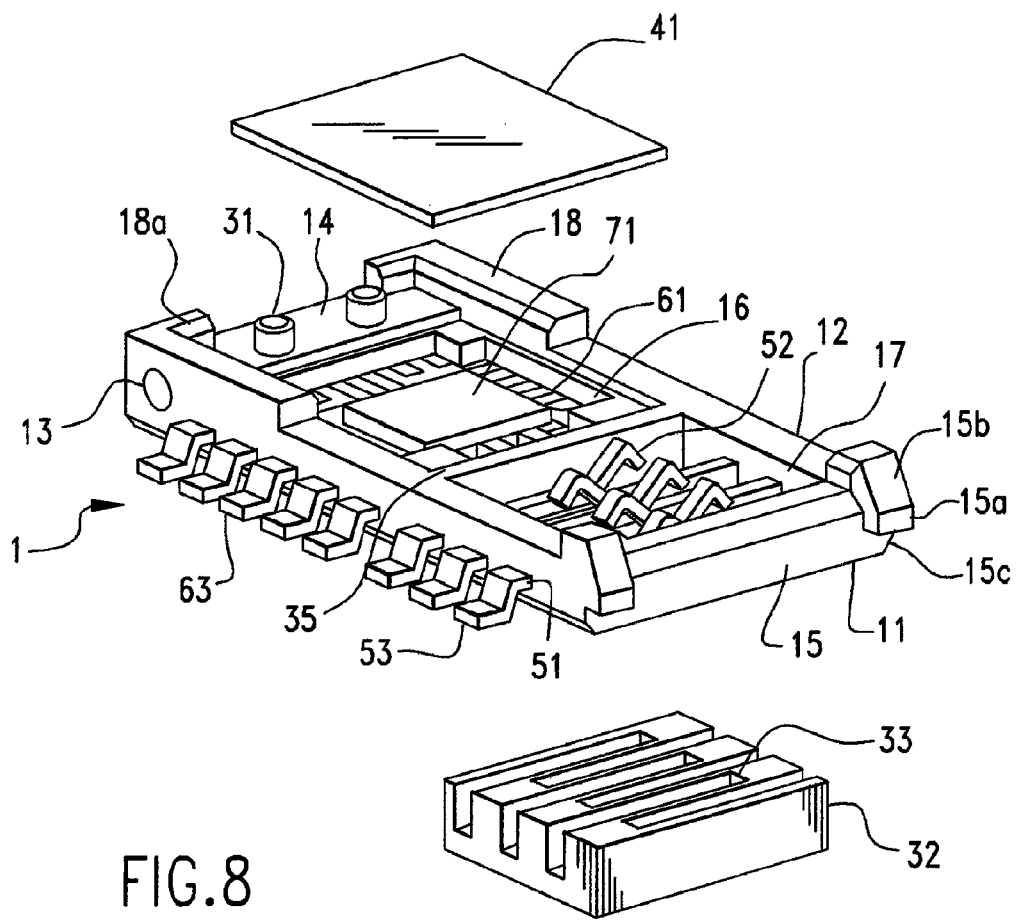
FIG. 8 is an exploded perspective view of the receptacle connector according to the embodiment of the Present Invention.
Figure 9:
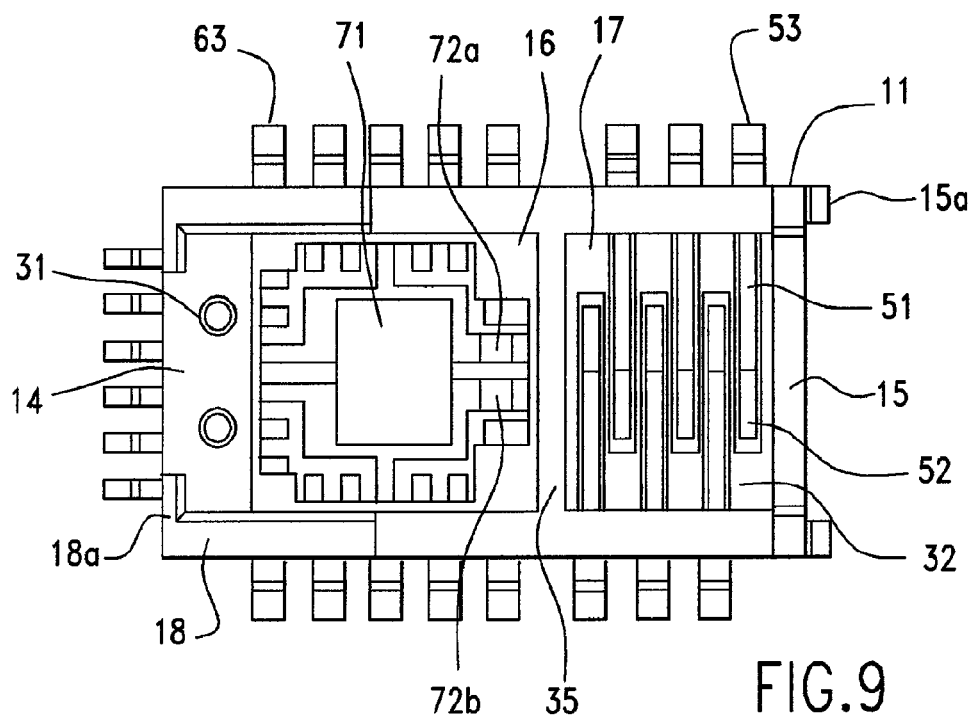
FIG. 9 is a top plan view of a connector housing according to the embodiment of the Present Invention.

FIGS. 8-9 illustrate the structure of the receptacle connector 1. On portions of the upper surfaces of the side wall portions 12 in the vicinity of the front end of the connector housing 11, frontward engagement protrusive walls 18 upwardly projecting and extending in the long-axis direction are connected. Moreover, the frontward engagement protrusive walls 18 are provided with auxiliary portions 18*a* integrally connected to front ends thereof and extending in the short-axis direction, that is, the width direction. Owing to this configuration, each of the opposite frontward engagement protrusive walls 18 has an L shape in plan view and can be engaged with each of corner portions at both sides of the front end of the plug 120. That is, inner side surfaces of each frontward engagement protrusive wall 18 and a rear side surface of each auxiliary portion 18*a* are engaged with the side surfaces and the front end surface of the plug 120 in the vicinity of the front end thereof, respectively.

Moreover, the positioning between the connector housing 11 and the plug 120 is primarily carried out based on the guide portion 14. Furthermore, the positioning in the up-down direction, that is, the thickness direction of the plug 120 is carried out based on the upper surface of the guide portion 14, and the positioning in the long-axis direction and the short-axis direction, that is, the axial direction and the width direction of the hybrid cable 101 is carried out based on the guide projections 31. In addition, in the example illustrated in the drawing figures, although the number of guide projections 31 is two, the number may be one or three or more. However, it is preferable that a plurality of guide projections 31 is provided.

Moreover, in the optical connection portion 16, an optical device such as the control IC 71 as a light receiving/emitting control device provided with the optical semiconductor device 72, e.g., the light receiving element 72*a* and the light emitting element 72*b*, and a control circuit for controlling the optical semiconductor device 72 are received. Furthermore, in the example illustrated in the drawing figures, although the light receiving element 72*a* is arranged on the right side and the light emitting element 72*b* is arranged on the left side, as viewed from the front side, the light receiving element 72*a* may be arranged on the left side and the light emitting element 72*b* may be arranged on the right side. In addition, in the example illustrated in the drawing figures, although one light receiving element 72*a* and one light emitting element 72*b* are arranged, the number of the light receiving element 72*a* and the light emitting element 72*b* may be arbitrarily set. For example, they may be provided two, or two or more in number. Moreover, the positions of the light receiving element 72*a* and the light emitting element 72*b* with respect to the long-axis direction of the connector housing 11 correspond to positions of the plug 120 engaged with the receptacle connector 1 disposed right below the slope surface 162 of the optical path conversion portion 161. Meanwhile the positions of the light receiving element 72*a* and the light emitting element 72*b* with respect to the short-axis direction of the connector housing 11 correspond to positions of the plug 120 engaged with the receptacle connector 1 disposed right below the respective core portions 111.

Although the control IC 71 connected to the light receiving element 72*a* and the light emitting element 72*b* may be arranged at an arbitrary position within the optical connection portion 16, from the viewpoint of improving the transmission/reception performance of signals between the light receiving element 72a and the light emitting element 72b, the control IC 71 is preferably disposed at a position close to the light receiving element 72a and the light emitting element 72b. Moreover, the control IC 71 is not necessarily formed to be separated from the light receiving element 72a and the light emitting element 72b, but the control IC 71 may be integrally formed with the light receiving element 72a and the light emitting element 72b. Furthermore, the control IC 71 may be integrally formed with either one of the light receiving element 72a or the light emitting element 72b.

In addition, in the optical connection portion 16, the optical terminals 61 are received which are capable of connecting the light receiving element 72a and the light emitting element 72b with the control IC 71 and connecting the control IC 71 with connection pads formed on a surface of a board. The portions of the optical terminals 61 connected to the connection pads formed on the surface of the board are configured as the tail portions 63 which outwardly project from the connector housing 11. Moreover, the tail portions 63 are not necessarily configured to project from only the side surfaces of the side wall portions 12 of the connector housing 11, but as illustrated in FIG. 9, they may be configured to project from the front end surface of the guide portion 14. It is to be noted that the number and the arrangement of the tail portions 63 can be set arbitrarily.

On the upper surface of the optical connection portion 16, a thin plate-like sealing plate 41 formed of a translucent material such as glass is mounted. For example, an adhesive is applied to an upper surface of a convex portion in the optical connection portion 16, and the sealing plate 41 is placed on the optical connection portion 16, so that the upper surface of the optical connection portion 16 is sealed, and thereafter, the adhesive is cured by means of heating, UV irradiation, and the like. Owing to this configuration, the optical connection portion 16 becomes a hermetically sealed space with a surrounded perimeter, and thus, it is possible to prevent foreign material such as dust in the air from entering into the optical connection portion 16 and thus contaminating the light receiving element 72a, the light emitting element 72b, the control IC 71, the optical terminals 61, and the like. Moreover, since the sealing plate 41 has translucent properties, the light receiving element 72a and the light emitting element 72b received in the optical connection portion 16 can receive or emit light having passed through the sealing plate 41.

Moreover, the electric connection terminals 51 are received in the electric connection portion 17. Furthermore, a spacer member 32 is received in the electric connection portion 17, for holding the respective electric connection terminals 51 to thereby prevent neighboring ones of the electric connection terminals 51 from contacting with one another. It is to be noted that the spacer member 32 may be appropriately omitted if not necessary.

In the example illustrated in the drawing figures, each of the electric connection terminals 51 is a cantilever-like member extending in the short-axis direction of the connector housing 11 and having a proximal end portion thereof being supported by penetrating through one of the side wall portions 12 and a free end thereof disposed at a position within the electric connection portion 17 close to the other of the side wall portions 12. Moreover, the contact portions 52 formed in the vicinity of the free end are also disposed within the electric connection portion 17, and the tail portions 53 extending in a direction away from the contact portions 52 outwardly project from the outer side surfaces of the side wall portion 12. The contact portions 52 are approximately Λ-shape so that they are projected further outward from the upper surfaces of the side wall portions 12 to come into contact with the connection pad portions 152 of the hybrid cable 101.

Moreover, the electric connection terminals 51 are arranged such that the proximal end portions of neighboring terminals are branched toward left and right sides to be alternately supported by the left and right side wall portions 12. Furthermore, in each of the electric connection terminals 51, the contact portion 52 is disposed at a position close to the side wall portion 12 at an opposite side to the side wall portion 12 that supports the proximal end portion. Owing to this configuration, the contact portions 52 are arranged in a zigzag form and arranged in tandem in the long-axis direction of the connector housing 11, as viewed in top plan view, and such an arrangement corresponds to the arrangement of the connection pad portions 152 of the hybrid cable 101. Moreover, since the portion extending from the contact portion 52 capable of being elastically deformed to function as a spring to the proximal end portion increases in a length thereof, an elastically deformable range is broadened. Therefore, it is possible to prevent the electric connection terminals 51 from being plastically deformed. In addition, it is possible to provide a sufficiently large contact pressure of the contact portions 52 exerted to the connection pad portions 152. It is to be noted that the number and the arrangement of the electric connection terminals 51 can be arbitrarily set so as to correspond those of the connection pad portions 152 of the hybrid cable 101.

The spacer member 32 is fixed by being inserted into the electric connection portion 17 through an open bottom surface of the electric connection portion 17. Moreover, in the spacer member 32, a plurality of terminal receiving grooves 33 having an open upper surface is formed so as to extend in the short-axis direction of the connector housing 11, so that portions of the electric connection terminals 51 extending within the electric connection portion 17 are received in the terminal receiving grooves 33. Owing to this configuration, it is possible to prevent neighboring ones of the electric connection terminals 51 from coming into contact with one another within the electric connection portion 17.

Referring now to FIG. 10, a description of the operation of connecting the hybrid cable 101 to the receptacle connector 1 by tightly fitting the plug 120 to be engaged with the receptacle connector 1 will be provided. First, as illustrated in FIG. 2, the lock member 21 of the receptacle connector 1 is moved to the open position so that the plug 120 is positioned above the connector housing 11. In this case, the lower surface of the plug 120, that is, the exposed surface of the connection pad portions 152 is positioned so as to oppose the upper surface of the connector housing 11. At the same time, the front crossbar portion 122 of the plug 120 is positioned right above the guide portion 14 of the connector housing 11, and the rear crossbar portion 123 of the plug 120 is positioned at a rear upper side of the rear-end wall portion 15 of the connector housing 11.

Subsequently, the plug 120 is lowered relative to the connector housing 11 so as to be tightly fitted with the connector housing 11. In this case, the guide projections 31 of the connector housing 11 are inserted into the guide holes 131 of the plug 120, and the plug 120 is lowered so that the guide holes 131 are aligned with the guide projections 31. With this operation, the guide holes 131 are engaged with the guide projections 31, and the position of the plug 120 relative to the connector housing 11 can be determined with high precision with respect to the axial direction and the width direction of the hybrid cable 101.

As a result, the optical path conversion portion 161, as the plug-side optical connection portion, and the plug-side electric connection portion 153 of the plug 120 are positioned so as to oppose the optical connection portion 16 and the electric connection portion 17 of the connector housing 11, respectively. Moreover, the position in the thickness direction is determined when the lower surface of the front crossbar portion 122 is brought into tight contact with the upper surface of the guide portion 14. Moreover, the corner portions at both sides of the front end of the plug 120 are engaged with the frontward engagement protrusive walls 18 at both sides of the connector housing 11. Furthermore, the side surfaces in the vicinity of the rear end of the plug 120 are engaged with the rearward engagement protrusive walls of the connector housing 11. Therefore, the positional relationship between the plug 120 and the connector housing 11 can be stably maintained. Owing to these configurations, the positional relationship is not disturbed even upon receipt of an unexpected external force.

Subsequently, the position of the lock member 21 is changed from the open position: specifically, the lock member 21 is rotated in the clockwise direction in the drawing figures about the rotation shaft 13, so that the lock member 21 reaches a position above the plug 120 as illustrated in FIG. 10A. When the lock member 21 is further rotated from this state, the distal end portions 27a of the latching arm parts 27 of the lock member 21 are brought into tight contact with the upper surfaces, that is, the tapered surfaces 15b of the lock projections 15a of the connector housing 11, as illustrated in FIGS. 10B and 10E.

When the lock member 21 is further rotated by an operator so that the latching arm parts 27 are moved downward, the distal end portions 27a are slid along the tapered surfaces 15b, and thus, the latching arm parts 27 are displaced in a direction (rightward in the drawing figures) away from the rotation shaft 13. Then, the flexible portion 22 having elastic properties is expanded so that the bent portion 22a is elastically deformed, and thus, the straight portions 22b at both sides of the bent portion 22a are elastically displaced in a direction indicated by the arrow a in FIG. 10C. Moreover, as illustrated in FIGS. 10C and 10F, when the distal end portions 27a of the latching arm parts 27 of the lock member 21 are brought into tight contact with the vertex portions of the lock projections 15a of the connector housing 11, the flexible portion 22 is in its most expanded state.

Moreover, when the lock member 21 is further rotated from the states as illustrated in FIGS. 10C and 10F so that the latching arm parts 27 are further moved downward, the distal end portions 27a are separated from the vertex portions of the lock projections 15a to enter into the concave latching portions 15c on the lower surface side of the lock projections 15a, as illustrated in FIGS. 10D and 10G. In this case, since the bent portion 22a restores to its original shape by a spring's restoring force so that the straight portions 22b at both sides of the bent portion 22a are displaced in a direction opposite to the direction of the arrow a, the flexible portion 22 is contracted to restore its original shape. Moreover, the distal end portions 27a are engaged with the lower surfaces of the lock projections 15a. Owing to this configuration, the lock member 21 is latched to the connector housing 11 at the closed position as illustrated in FIG. 10D so that the plug 120 is locked.

In addition, since by the extendable/contractible of the flexible portion 22, the distal end portions 27a of the latching arm parts 27 receive a force exerted in a direction (leftward direction in the drawing figures) toward the rotation shaft 13, the engagement range between the distal end portions 27a and the lower surfaces of the lock projections 15a becomes the maximum, and thus, the lock reliability is improved. Moreover, when the lock member 21 is moved to the closed position, similar to the example illustrated in FIG. 10D, the connection portions 22c of the flexible portion 22 are brought into tight contact with the upper surfaces of the side wall portions 12. However, the connection portions 22c may not be brought into tight contact with the upper surfaces of the side wall portions 12.

In this manner, as illustrated in FIGS. 3 and 10D, the plug 120 is locked by being tightly fitted with the receptacle connector 1, and thus, the hybrid cable 101 is firmly connected to the receptacle connector 1.

Moreover, when the lock member 21 is moved to the closed position, as illustrated in FIG. 3, the plug 120 is downwardly pressed by the first pressing portions 24a and the second pressing portions 25a, so that the lower surface of the plug 120 is pressed against the upper surface of the connector housing 11. As a result, the plug 120 becomes unable to move in the up-down direction, the front-rear direction, and the left-right direction, relative to the connector housing 11, and the plug 120 is completely engaged with the receptacle connector 1, so that the hybrid cable 101 is connected to the receptacle connector 1, and the hybrid cable 101 and the receptacle connector 1 are in the optically and electrically connected state. In this case, the connection pad portions 152 of the hybrid cable 101 press the corresponding contact portions 52 of the electric connection terminals 51 from the upper side. As a result, the electric connection terminals 51 are elastically deformed to exert a spring force, so that the contact portions 52 are pressed against the connection pad portions 152 by the spring force, and thus, the contact between the contact portions 52 and the connection pad portions 152 is securely maintained.

In addition, a balance between the pressing force of the first pressing portions 24a pressing the plug 120 and the pressing force of the second pressing portions 25a pressing the plug 120 can be appropriately adjusted. That is, the pressing force of the first pressing portions 24a may be set so as to be equal to the pressing force of the second pressing portions 25a, and any one of the pressing forces may be set so as to be stronger than the other force.

For example, the pressing force of the first pressing portions 24a may be set so as to be stronger than the pressing force of the second pressing portion 25a. In this case, since the pressing force of the first pressing portions 24a disposed close to the rotation shaft 13 being the center of rotation of the lock member 21 is stronger, it is possible to increase the pressing force for pressing the whole body of the plug 120 without needing to increase the force exerted by the operator, which is needed when the plug 120 is unlocked, as described later. That is, it is possible to increase the pressing force without needing to increase a load of the unlocking operation. Moreover, since the pressing force for pressing the portion close to the optical connection portion 16 is strong, it is possible to further increase the connection reliability. In addition, the pressing force of the second pressing portions 25a may be set so as to be stronger than the pressing force of the first pressing portions 24a.

Figure 11A:
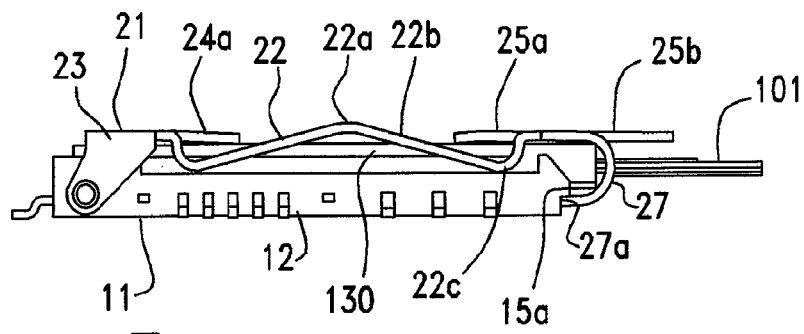
Figure 11B:
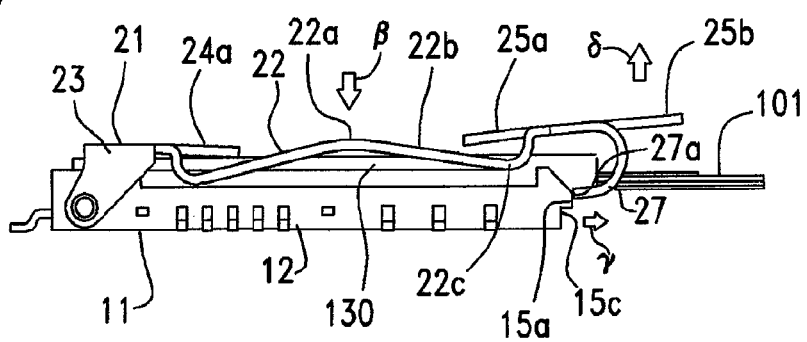

Referring finally to FIG. 11, a description of the operation of unlocking the plug 120 so that the plug 120 is removed from the receptacle connector 1 will be provided. As illustrated in FIG. 11A, it is necessary to unlock the plug 120 in order to remove the plug 120 from engagement with the receptacle connector 1. In this case, the operator downwardly presses the bent portions 22a of the latching arm parts 27 with the operator. In this way, when the vertex portions of the bent portions 22a are displaced in a direction indicated by the arrow β in FIG. 11B, the bent portions 22a are elastically deformed so that the straight portions 22b at both sides of each bent portion 22a are elastically deformed in a direction indicated by the arrow α, and thus, the flexible portions 22 are expanded. As a result, the distal end portions 27a of the latching arm parts 27 are displaced in a direction away from the rotation shaft 13, i.e., in a direction indicated by the arrow γ in FIG. 11B, the distal end portions 27a are disengaged from the lower surfaces of the lock projections 15a. That is, the latched state between the distal end portions 27a of the latching arm parts 27 and the concave latching portions 15c is released.

Figure 11C:
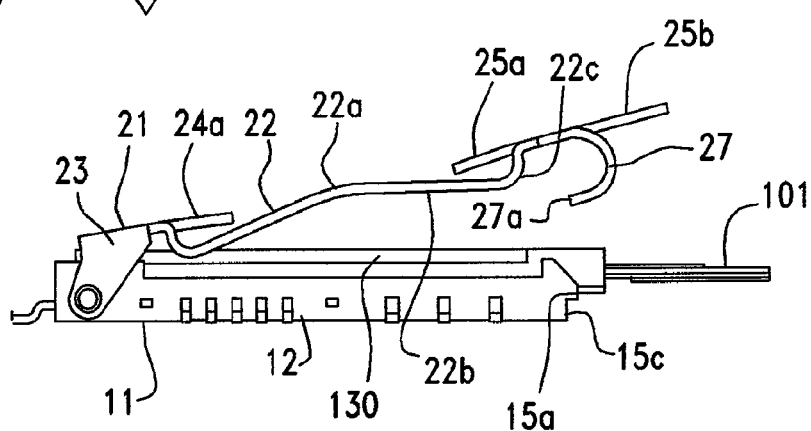
Figure 12:
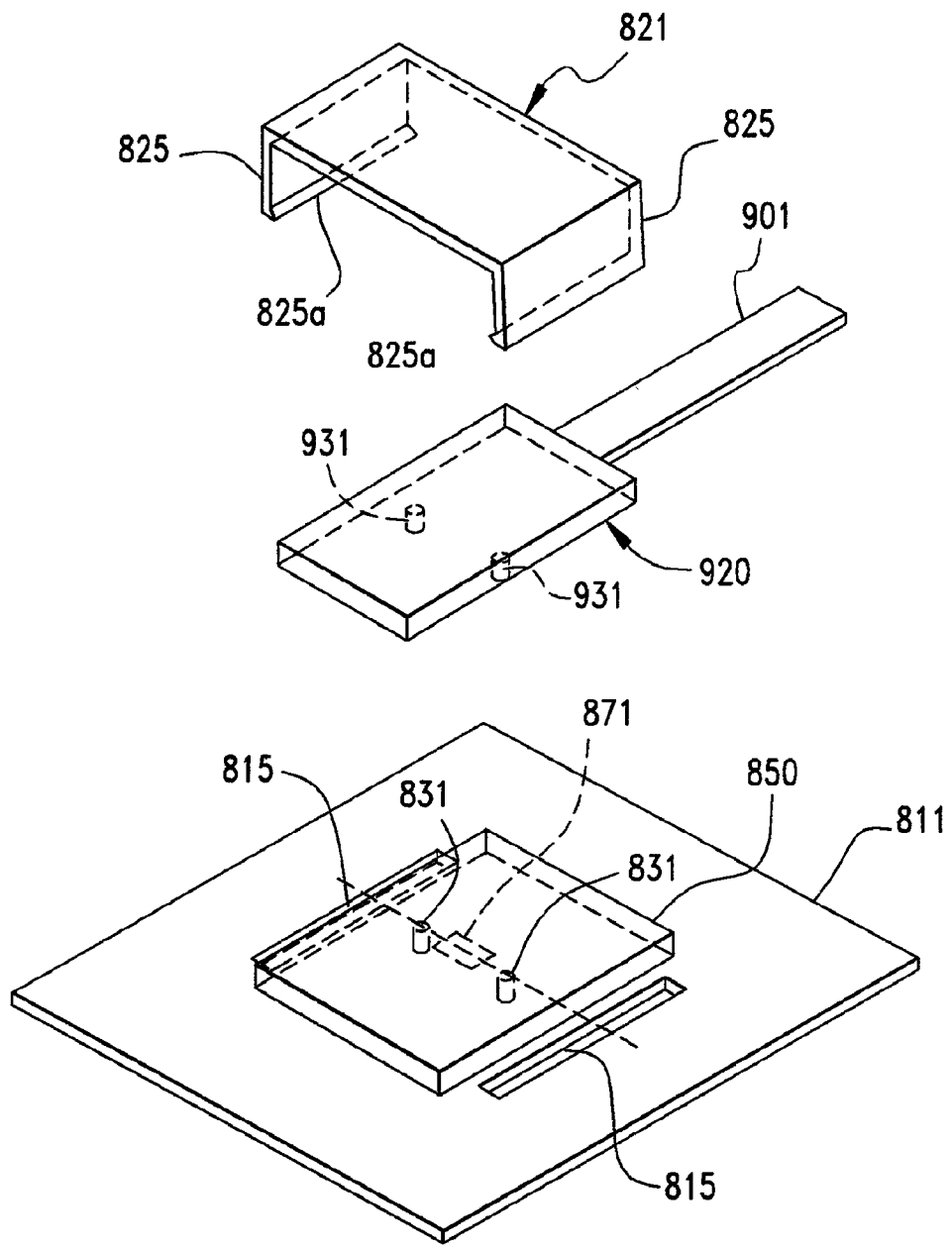
FIG. 12 is an exploded view of an optical connector according to the prior art.

In such a state, when the operator moves the operation portion 25b in a direction indicated by the arrow δ in FIG. 11B by the operator, the lock member 21 is rotated in the counterclockwise direction about the rotation shaft 13, so that the latching arm parts 27 are moved upward. With this operation, the plug 120 is unlocked as illustrated in FIG. 11C.

As described above, since the latched state between the distal end portions 27a of the latching arm parts 27 and the concave latching portions 15c is released by only downwardly pressing the bent portions 22a, the lock state of the plug 120 can be easily released, and thus, the unlocking properties are extremely improved. Moreover, even when the spring force exerted by the latching arm parts 27 is increased in order to improve the lock reliability, since the latched state between the distal end portions 27a of the latching arm parts 27 and the concave latching portions 15c can be released by only downwardly pressing the bent portions 22a, the distal end portions 27a and the concave latching portions 15c are not worn away, and thus, a high durability can be provided.

As described above, in the present embodiment, the connector 1 includes the connector housing 11 on which the plug 120 connected to the hybrid cable 101 is mounted; and the lock member 21 which is attached to the connector housing 11 in an attitude-changeable state so as to be capable of locking the plug 120; wherein the lock member 21 includes the bent portion 22a and is provided with a flexible portion 22 configured to expand or contract in accordance with a change in the degree of bending of the bent portion 22a and the latching arm part 27 configured to be engaged with or disengaged from the connector housing 11 by the extendable of the flexible portion 22.

Owing to this configuration, the plug 120 can be miniaturized, and it is thus possible to perform a wiring operation of the hybrid cable 101 in an extremely simple manner. Moreover, the plug 120 can be surely engaged, and thus, it is possible to attain secure connection with the hybrid cable 101. Furthermore, it is possible to realize both easy unlocking properties and reliable locking properties, and thus, even when engagement and disengagement of the latching arm part 27 with and from the connector housing 11 is repeated, the latching arm part 27 and the connector housing 11 might not be worn away, and hence, a high durability is guaranteed.

Moreover, the flexible portion 22 has one end thereof being connected to the latching arm part 27 and the other end thereof being connected to the mounting leg part 23 configured to be rotatably attached to the connector housing 11, and the bent portion 22a is positioned between the latching arm part 27 and the mounting leg part 23, so that a spacing between the latching arm part 27 and the mounting leg part 23 is increased or decreased in accordance with the change in the degree of bending of the bent portion 22a. Owing to this configuration, the latching arm part 27 can be displaced to be securely engaged with and disengaged from the connector housing 11 with a simple structure and in a simple manner.

Furthermore, the hybrid cable 101 is one which has laminated therein an optical waveguide and the conductive wires 151. The plug 120 is provided with the front crossbar portion 122, the optical path conversion portion 161, and the plug-side electric connection portion 153. The connector housing 11 is provided with the guide portion 14, the optical connection portion 16, and the electric connection portion 17. In addition, when the plug 120 is mounted on the connector housing 11, the guide portion 14 is engaged with the front crossbar portion 122, and the optical path conversion portion 161 and the plug-side electric connection portion 153 oppose the optical connection portion 16 and the electric connection portion 17.

Owing to this configuration, the plug 120 can be reduced in its entire size thereof, and it is thus possible to perform a wiring operation of the hybrid cable 101 in an extremely simple manner. Moreover, the plug 120 can be certainly engaged, and thus, it is possible to attain secure optical and electric connection with the hybrid cable 101. Furthermore, since the hybrid cable 101 is integrally formed by laminating the optical waveguide and the conductive wires 151, it is not necessary to wire the optical waveguide and the conductive wires 151 in an individual manner, and thus, the wiring operation is made easy.

In the present embodiment, a description has been made for the case where the cable is configured as the hybrid cable 101 having integrated therewith the optical waveguide and the conductive wires 151, and the connector is configured as the hybrid connector having the optical connection portion 16 and the electric connection portion 17. However, the cable may be configured to include any one of the optical waveguide and the conductive wires 151, and the connector may correspondingly be configured to include any one of the optical connection portion 16 and the electric connection portion 17.

While a preferred embodiment of the Present Invention is shown and described, it is envisioned that those skilled in the art may devise various modifications without departing from the spirit and scope of the foregoing Description and the appended claims.

What is claimed is:

1. A connector, comprising:
   a connector housing , the connector housing being configured to mount thereon a plug having a cable connected thereto; and
   a lock member, the lock member being attached to the connector housing in an attitude-changeable state and configured to be capable of locking the plug;
   wherein the lock member includes:
      a bent portion;
      a flexible portion, the flexible portion, from one end, extending at an angle relative to the connector housing upward to a vertex and then downward back to the connector housing at the same angle, and being configured to extend or contract in response to a change in an extent of bending of the bent portion; and
      a latched portion, the latch portion being configured to engage with or disengage from the connector housing by the extension or contraction, respectively, of the flexible portion.

2. The connector of claim 1, wherein the flexible portion has one end being connected to the latched portion and the other end being connected to an attachment portion, the attachment portion being configured to be pivotably attached to the connector housing.

3. The connector of claim 2, wherein the bent portion is positioned between the latched portion and the attachment portion, so that a spacing between the latched portion and the attachment portion is increased or decreased in response to a change in the extent of bending of the bent portion.

4. The connector of claim 3, wherein the plug has a positioned portion provided therein.

5. The connector of claim 4, wherein the connector housing has a positioning portion provided therein.

6. The connector of claim 5, wherein while the lock member is being maintained at an open position thereof, the plug is mounted on the connector housing so that the positioning portion is engaged with the positioned portion.

7. The connector of claim 6, wherein when the lock member is brought to a closed position thereof, the plug is locked at the connector housing thereby establishing a connection to the cable.

8. The connector of claim 7, wherein the plug is mounted on the connector housing so that a lower surface thereof opposes an upper surface of the connector housing.

9. The connector of claim 8, wherein the lock member is provided with a plug pressing portion, the plug pressing portion being configured to press an upper surface of the plug toward an upper surface of the connector housing.

10. The connector of claim 9, wherein the connector housing is provided with a latching portion with which the latched portion is engaged or from which the latched portion is disengaged, the latching portion having a tapered slope surface, the tapered surface being formed on an upper surface thereof and allowing a distal end portion of the latched portion to slide thereon, and a concave latching portion, the concave latching portion being formed under the tapered slope surface and allowing the distal end portion of the latched portion to come into the concave latching portion.

11. The connector of claim 10, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

12. The connector of claim 7, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

13. The connector of claim 9, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

14. The connector of claim 1, wherein:
the plug has a positioned portion provided therein;
the connector housing has a positioning portion provided therein;
while the lock member is being maintained at an open position thereof, the plug is mounted on the connector housing so that the positioning portion is engaged with the positioned portion; and
when the lock member is brought to a closed position thereof, the plug is locked at the connector housing thereby establishing a connection to the cable.

15. The connector of claim 14, wherein the plug is mounted on the connector housing so that a lower surface thereof opposes an upper surface of the connector housing.

16. The connector of claim 15, wherein the lock member is provided with a plug pressing portion, the plug pressing portion being configured to press an upper surface of the plug toward an upper surface of the connector housing.

17. The connector of claim 16, wherein the connector housing is provided with a latching portion with which the latched portion is engaged or from which the latched portion is disengaged, the latching portion having a tapered slope surface, the tapered surface being formed on an upper surface thereof and allowing a distal end portion of the latched portion to slide thereon, and a concave latching portion, the concave latching portion being formed under the tapered slope surface and allowing the distal end portion of the latched portion to come into the concave latching portion.

18. The connector of claim 17, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

19. The connector of claim 14, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

20. The connector of claim 16, wherein:
the cable is a hybrid cable having laminated therein an optical waveguide and conductive wires;
the plug is provided with a plug-side optical connection portion and a plug-side electric connection portion;
the connector housing is provided with an optical connection portion and an electric connection portion; and
when the plug is mounted on the connector housing, the plug-side optical connection portion and the plug-side electric connection portion oppose the optical connection portion and the electric connection portion, respectively.

\* \* \* \* \*